May 31, 1960  L. A. BISSO ET AL  2,939,011

WEAR TEST METHOD AND APPARATUS

Filed July 1, 1954

INVENTORS
HARRY G. HALL
LOUIS A. BISSO
BY
Thomas G. Bell
AGENT

United States Patent Office 2,939,011
Patented May 31, 1960

2,939,011
WEAR TEST METHOD AND APPARATUS

Louis A. Bisso, Concord, and Harry G. Hall, Martinez, Calif., assignors to Tidewater Oil Company, a corporation of Delaware Filed July 1, 1954, Ser. No. 440,626

5 Claims. (Cl. 250—83)

The present invention relates to a method and means for determining wear of a surface, continuously, and more particularly to a safe continuous procedure for determining the type and degree of wear of metal surfaces such as bearings, pistons and cylinders of internal combustion engines, gears, and the like.

The evaluation of motor oils and fuels with respect to engine wear has long been a problem. Conventional practice in measuring wear, particularly of metal surfaces, was to measure the wear by loss of weight or by change in dimensions of metal parts. The measuring and weighting procedures required were not only tedious and time consuming, but were also entirely inadequate when determining very small amounts of wear or measuring the wear of a particular engine part. It was not until irradiated engine parts were used in engine wear studies that any accurate information could be obtained concerning the rate of wear of a particular engine part. Generally, such studies are conducted by subjecting a radioactive engine part to wear in the presence of a fluid, such as lubricating oil, capable of carrying radioactive wear debris, and after a desired wear period the radioactivity of the fluid is measured. One procedure for determining wear by use of irradiated engine parts is disclosed in U.S. Patent No. 2,315,845.

In such systems for determining wear of a radioactive test part, the only source of radioactivity in the system is the irradiated part. As a result, any radioactivity in the oil must represent a definite amount of metal worn from the part and, accordingly, wear measurements of considerable accuracy may be based on the amount of radioactivity in the circulating oil. However, one defect with present procedures for measuring wear has been an inability to obtain wear data continuously throughout an engine study due to a tendency of larger radioactive wear particles to settle out of the lubricant system or to collect on internal engine surfaces. These collections of larger particles are likely to escape measurement unless they are recovered prior to each measurement, and thereby introduce considerable error into the wear determination. Since, for proper accuracy, such recovery procedures generally involve dismantling and washing of the test equipment, accurate continuous studies have heretofore not been achieved. Another problem inherent in present procedures is their inability to determine the extent to which wear debris of harmful particle size may be introduced into the lubricant system by a particular condition of engine wear. This is because present devices to measure radioactive wear debris provide no means or procedure for selectively measuring portions of the radioactive material according to particle size.

The present invention provides a solution to these and additional problems, as will appear. Accordingly one important object of the present invention is to provide a safe, continuous method and means for determining the wear of an irradiated engine part, which permits accurate measurements at any time during the test period.

Another object of the present invention is to provide a continuous method and means for analyzing the extent of wear of a particular character, as, for example, the amount of debris worn from an engine part which falls within a definite range of particle sizes.

Another object of the invention is to provide a means for selectively removing radioactive wear debris from a lubricant system so that the type and extent of engine wear can be accurately determined.

Another object is to provide a means for measuring the wear of an irradiated engine part which permits accurate conversion of radiation counts into units of wear.

Another object is to provide a safer means for determining wear of irradiated engine parts without interfering with the accuracy of the measurements.

Other objects and advantages of the present invention will appear from the following description and from the drawings in which.

Broadly, the present invention is drawn to a combination filter and radiation counter A which when used in a lubricant system in conjunction with a radiation counter B permits a continuous determination of wear of an irradiated test piece with a degree of accuracy not heretofore possible. This is possible because: (1) the filter removes at first pass the larger particles of radioactive wear debris that would normally collect in engine recesses or settle out of the oil, causing erroneous measurements; (2) the filter provides a depository for radioactive wear debris which may be spaced a known and constant distance from the radiation counter so as to insure reproducible geometry for accurate conversion of radiation counts to units of wear; (3) the filter also provides removable element that permits the efficiency of measurements of radioactive wear debris collecting on the filter to be calibrated against known amounts of radioactivity deposited on the filter; and (4) by employing filter media of known uniform porosity, the degree and type of wear occurring on a particular irradiated engine part may be determined. In addition, the presence of the filter permits determinations to be made in a greater degree of safety than prior methods and devices, primarily because the removal of the bulk of the radioactive wear debris from the circulating oil substantially reduces the amount of activity that might be deposited in the combustion chamber.

In conducting a wear determination in accordance with the present invention, a suitable irradiated test piece is installed in engine C. The test piece is then subjected to wear in the presence of a known quantity of lubricating oil. The oil is circulated through the system by a suitable pump P so that larger particles of filterable, wear debris are removed from the circulating oil by the filter counter A almost as soon as they are worn from the test piece. The radioactivity of the circulating oil, due to the presence of wear debris, may be continuously measured by the oil counter B. At the same time, the radioactivity of both the oil and filtered wear debris may be continuously measured by the filter counter A. Any suitable means may be used to measure the radioactivity, such as geiger or scintillation counters D and E, and the degree and extent of wear continuously determined and calculated from the radioactivity so measured.

Figure 1:
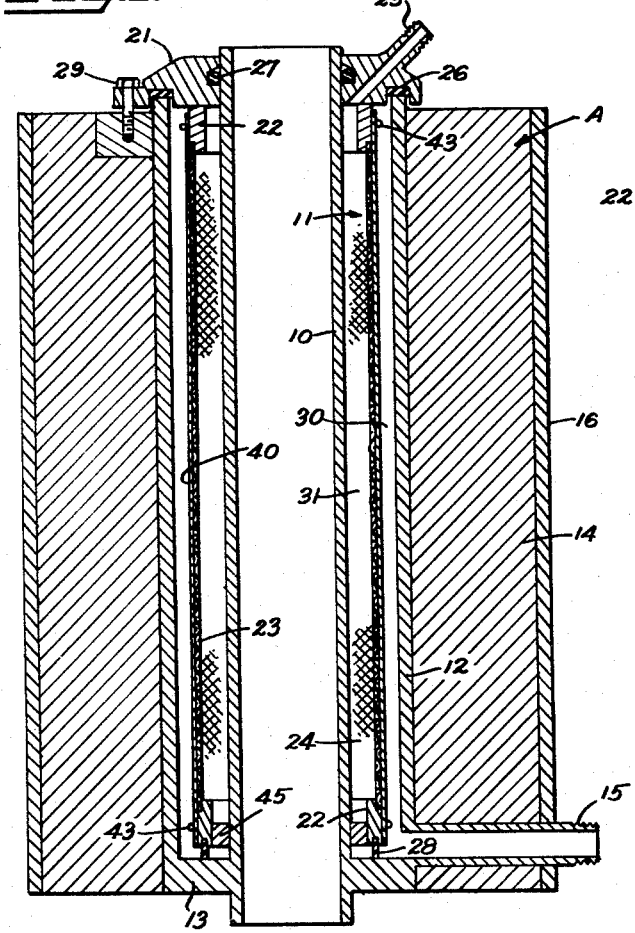
Figure 1 is a view in vertical section of a combination filter and radiation counter which is particularly adapted to carrying out the procedures of the present invention.
Figure 2:
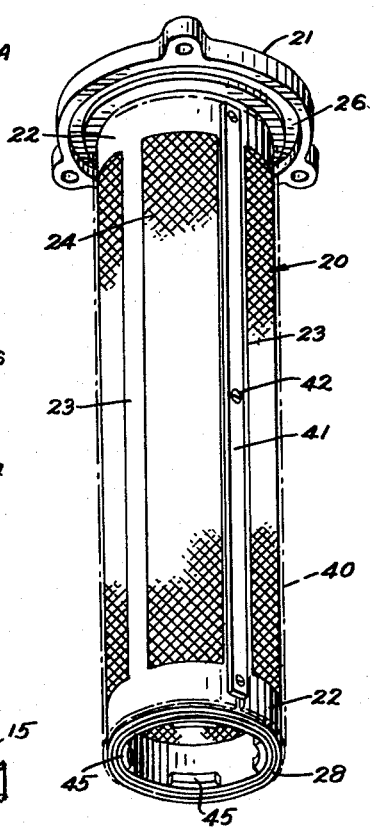
Figure 2 is a perspective view of a removable filter portion of the device of Fig. 1, with the filter media shown in dotted outline so as to reveal the underlying structure.

Figures 1 and 2 illustrate a preferred embodiment of the filter and radiation counter A. Essentially, the filter counter A comprises an open-ended tube 10 for a geiger counter D about which is concentrically positioned a filter chamber 11. Enclosing the filter chamber 11 is a filter shell formed by an outer concentric wall 12, an end wall 13 and the central tube 10. For safety and also to reduce background radiation, it is desirable to provide a layer of shielding material about the filter shell, such as lead shielding 14. An inlet into the filter chamber is provided by a conduit 15 extending through the shell, shielding material 14, and an outer casing 16.

According to the present invention, a filter is used to remove the larger particles of radioactive wear debris from the circulating lubricant so that they may be independently measured. Preferably, the filter is mounted as part of a replaceable filter cartridge 20 which may be inserted into filter chamber 11. As best seen in Figure 2, cartridge 20 includes a head or closure member 21 and a cylindrical supporting frame 22 for the filter 40 (dotted outline in Figure 2). The frame 22 is preferably constructed with longitudinal ribs 23 and screened openings 24 to provide a firm support for the filter 40. Suitable guide members, shown as projections 45, may also be provided adjacent the lower edge of the cartridge to insure proper spacing of filter 40 from central tube 10. An outlet from the filter chamber is provided by conduit 25 extending through the head 21.

It is evident that suitable gasket means must be provided to insure a leak-tight closure of filter chamber 11 and to prevent filterable material from bypassing filter 40. As a preferred means, deformable sealing rings of a suitable oil resistant material may be retained by closure member 21 and filter frame 22 to provide leak-tight seals at the necessary points. In the illustrated device, a gasket 26 is recessed in the lower radial face of the closure member to seal against the upper edge of wall 12, and an annular groove is provided on the inner periphery of closure 21 to retain an O-ring 27 in sliding sealing relation to tube 10. Similarly, a gasket 28 may be retained in the lower edge of frame 22 to seal against lower wall 13 of the filter shell. Upon insertion of cartridge 20 into filter chamber 11 the O-ring 27 sealingly receives the tube 10, while suitable fastening means, such as cap screws 29, may be used to compress the gaskets 26 and 28 in a leak-tight manner against the filter shell and the wall 13, respectively.

In use, the filter cartridge serves to divide the filter chamber 11 into two separate compartments 30 and 31 with the filter 40 interposed concentrically between the two. As will be apparent to one skilled in the art, debris laden oil will enter through the inlet 15 and pass upwardly into the outer space 30. From the space 30 the oil passes through filter 40 into the inner space 31 and then outwardly through head conduit 25. As a result, radioactive wear debris deposited on filter 40 will be uniformly spaced with respect to a radiation counter D inserted into tube 10. This feature of the invention provides a reproducible geometry to radiation counts obtained and, thereby, permits a high degree of accuracy in converting such radiation counts to units of wear. The uniform spacing also permits impregnation of filter 40 with known amounts of radioactivity so that the efficiency of subsequent counts of the radioactivity of wear debris collecting on the filter may be calibrated against the known values. As a result, wear determinations may be achieved with a degree of accuracy not previously possible.

In carrying out the invention, best results have been obtained through the use of filter media of uniform, gradeed porosity and negligible thickness. Accordingly, chemical grades of filter paper or filter cloth have proved very satisfactory. One advantage of filter paper, for example, is that it alters very little the uniform geometry provided by the construction of the filter counter A. Another advantage is that by varying the grade of filter paper, control may be obtained over the particle size of radioactive debris deposited on the filter paper so that wear determinations may reflect the type and degree of wear that is occurring.

It is evident that the filter paper 40 may be secured to the supporting frame 22 in a variety of ways. A preferred clamp type construction is illustrated in Figure 2 in which 41 designates a clamp bar which is adjustably positioned with respect to an adjacent rib 23 by set screws 42. To mount a section of filter paper 40 on the cartridge 20, it is only necessary to loosen screws 42 until the ends of the filter are positioned beneath the opposite edges of bar 41 and then tighten the screws to hold the filter media firmly on supporting frame 22. Preferably, O-rings or sections of wire 43 are tightly positioned about end portions of the filter paper 40, adjacent the supporting frame 22, to prevent wear debris from inadvertently bypassing the filter media.

As has been indicated, an oil counter B is preferably used in conjunction with the filter counter A. One way to construct the oil counter B is to duplicate the shell structure of the filter counter A omitting the filter cartridge 20. This may be accomplished providing an oil outlet 44 similar in structural detail to inlet 15. By omitting the filter structure, passage of the oil through the device is virtually unimpeded. The oil counter B is useful in obtaining comparative data on engine wear, as will appear.

In determining the surface wear of an irradiated engine part, such as a piston ring, bearing or the like, it is apparent that the test piece must be of substantially uniform composition, substantially uniformly radioactive, and susceptible to relatively uniform wear. Such a test piece may be a naturally radioactive substance, such as radium or uranium compounds, or artificially activated elements, such as those described in U.S. Patent No. 2,315,845, where bombardment with neutrons or deuterons in a cyclotron is employed. In the present invention, it is preferred to use substances artificially activated by neutron irradiation in a nuclear reactor, producing radioisotopes which are gamma emittors. Examples of such substances are set forth in Table I.

Table I

| Radioisotope | Half-Life | Gamma Energy in Mev. |
| --- | --- | --- |
| Arsenic 76 | 26.8 hours | 2.1 |
| Antimony 124 | 60 days | 2.06 |
| Silver 110 | 270 days | 1.516 |
| Copper 64 | 12.8 hours | 1.34 |
| Cobalt 60 | 5.3 years | 1.33 |
| Iron 59 | 46.3 days | 1.3 |
| Tantalum 182 | 117 days | 1.237 |
| Zinc 65 | 250 days | 1.11 |
| Zirconium | 65 days | 0.708 |
| Tungsten 187 | 24.1 hours | 0.680 |
| Iron 55 | 2.9 years | 0.07 |

According to the present invention, measurement of wear of an irradiated engine part may be continuously accomplished by measuring the amount of radioactivity carried in the oil and also the amount of radioactivity deposited on the filter 40. Since the only source of radioactivity in the system is the irradiated engine part, the radioactivity in each case must represent a definite amount of metal worn from the part. The presence of the filter in the system insures that the measurements of radioactivity will accurately reflect substantially all the radioactive metal that has been worn from the part, since the larger metal particles will be trapped on the filter 40 before they have a chance to settle out of the circulating oil. As a result, the wear of the part may be represented in terms of milligrams of non-filterable metal circulating in the oil and filterable metal trapped on the screen. In addition, it is possible to represent the filterable wear in terms of a definable range of filter porosities. Accordingly, valuable information as to the size of the wear particles may be obtained by varying the known porosity of the filter media 40 between desired ranges.

Figure 3:
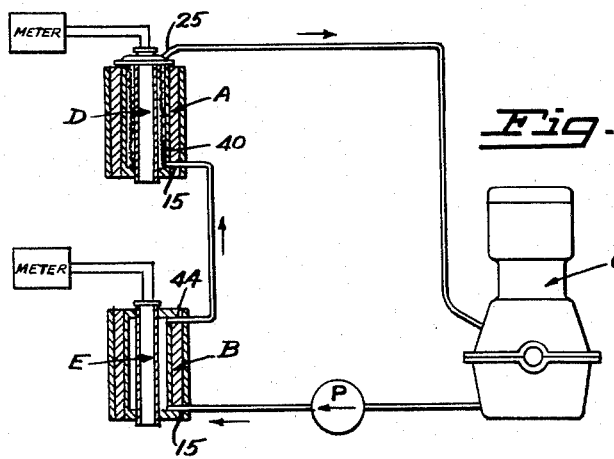
Figure 3 is a diagrammatic representation of an apparatus, embodying the principles of the invention, for continuously determining the wear of an irradiated engine part.

The principles of the present invention may be successfully employed to continuously determine both the degree and type of wear of a radioactive substance as follows:

An irradiated engine part as, for example, a piston ring composed of a high carbon alloy steel rendered radioactive by irradiation with a neutron flux in a nuclear reactor, is installed in an internal combustion engine C and is caused to wear in the presence of a suitable lubricating oil. The oil from the engine crankcase is circulated through the two counting cells B and A by a pump P. As shown in Figure 3, the oil from the pump passes through the oil counter B and then through the filter counter A before returning to the engine. The radioactivity of the non-filtered oil circulating through the oil counter B is continuously monitored by a Geiger counter E. At the same time, the radioactivity of both filtered and non-filtered oil passing through the filter counter A, plus the radioactivity of all the filterable wear debris deposited on the filter 40, is monitored by a Geiger counter D. From the activities thus measured, the total amount of wear of the part may be calculated for any point occurring within a wear period. In addition, the percent of the wear deposited on the filter paper 40 may also be calculated. By varying the porosity of the filter 40, the comparative sizes of filterable wear particles may be determined for a number of such studies of engine parts.

As will be evident to one skilled in the art, it is not necessary to know precise filter data, such as pore sizes, in order to evaluate the relative particle sizes of engine wear debris. By previously calibrating the filtering efficiency of different filter media with respect to a known volume of fluid containing filterable material of known particle size, the general character and comparative sizes of deposited engine wear particles can be determined. Of course, where exact information as to the porosity of the filter media is known, more exact information regarding the particle sizes of the filtered wear debris can be obtained. In the results tabulated below, the relative filtration times determined for three grades of filter paper ranged from 80 seconds for the most porous paper to 120 seconds for the least porous paper. Also, from available data, it was known that in no case did the actual pore size exceed 5 microns. The resulting wear determinations, reproduced in Table II, illustrate the useful type of comparative data that may be obtained, continuously, throughout engine wear studies conducted according to the above procedures.

To insure the necessary degree of accuracy to the above calculations, the efficiencies of the Geiger counters are carefully calibrated. With respect to radioactivity in the oil, calibration may be accomplished by putting into solution within both the cells A and B varying known amounts of radioactive $Fe^{55}$ and $F^{59}$, and calibrating the cell counts against this known activity over a range sufficient to include the test data. With respect to the counts of filterable material deposited on the filter paper, the efficiency of the counter A is determined by evaporating varying known amounts of the $Fe^{55}$, $Fe^{59}$ solution directly on a sheet of filter paper, and again calibrating the radiation counts against the known deposited activity. In addition, corrections for background count are computed for each Geiger counter, in a well known manner.

The activities of the test rings may be computed, in each case, by placing a fragment of identical composition with the piston ring in the nuclear reactor during irradiation. The fragment may then be dissolved and its activity counted in a radiation counter of known efficiency. Knowing the respective weights of the fragment and the test ring, the activity of the ring is readily calculated. The half life of the test ring is computed by withdrawing a highly radioactive sample of the oil prior to initiating the test. The radioactivity of this oil sample is measured until the half life period can be determined.

To convert the radiation counts measured by the two counting cells into units of wear, the following formulas may be relied on.

For the oil counter B:

$$C_t = \frac{C_o}{\text{Eff. of } B} \times \frac{V_t}{V_b}$$

Where $C_t$ is the total number of radioactive disintegrations per minute in all of the oil; $C_o$ is the counts per minute indicated for the oil in oil counter B less background; Eff. of B is the counting efficiency of the oil counter B; and $V_t/V_b$ is the ratio of the volume of oil in the entire system to the volume of oil in the oil counter.

For the filter counter A:

$$C_t = \frac{\frac{C_o}{\text{Eff. of } B} \times \frac{V_t}{V_b} + C_t - C_o \times \frac{V_a}{V_b} \times \frac{\text{Eff. of } A_o}{\text{Eff. of } B_o}}{\text{Eff. of } A_f}$$

Where, in addition, $C_t$ is the counts per minute indicated for the filter counter less background; $V_a/V_b$ is the ratio of the volume of the filter counter to that of the oil counter; Eff. of $A_o$/Eff. of $B_o$ is the ratio of their counting efficiencies for radioactivity in the oil, and Eff. of $A_f$ is the counting efficiency of the filter counter A for activity trapped on the filter paper 40.

It will be apparent that the illustrative procedure and apparatus makes possible continuous determinations of minute amounts of wear with a degree of accuracy not previously possible. These results are possible due to the ability of the filter counter A to trap the larger particles of radioactive wear debris from the rapidly circulating lubricant before these larger particles can settle out of the circulating fluid and cause erroneous readings.

*Table II*

LOSS BY RADIOACTIVE MEASUREMENT (MGS.)

| Elapsed Time of Test in (hours) | Filter Paper Speed, 120 Seconds | | | Filter Paper Speed, 100 Seconds | | | Filter Paper Speed, 80 Seconds | | |
|---|---|---|---|---|---|---|---|---|---|
| | Total Wear (mgs.) | Wear on Filter (mgs.) | Percent Wear on Filter | Total Wear (mgs.) | Wear on Filter (mgs.) | Percent Wear on Filter | Total Wear (mgs.) | Wear on Filter (mgs.) | Percent Wear on Filter |
| 1 | 0.320 | 0.061 | 19 | 0.330 | 0.052 | 16 | 0.280 | 0.036 | 13 |
| 2 | 0.400 | 0.082 | 20 | 0.390 | 0.063 | 16 | 0.400 | 0.056 | 14 |
| 4 | 0.440 | 0.110 | 25 | 0.440 | 0.089 | 20 | 0.450 | 0.076 | 17 |
| 6 | 0.480 | 0.120 | 25 | 0.470 | 0.097 | 21 | 0.490 | 0.088 | 18 |
| 8 | 0.530 | 0.150 | 28 | 0.520 | 0.120 | 23 | 0.540 | 0.100 | 19 |

As a result, these larger particles cannot escape a continuous monitoring of the radioactive metal worn from the test part. In addition, by using filter media of different porosity, continuous information relating to the wear of an engine part, under different operating conditions, may be obtained. A further advantage is the ability to continuously study during the test period the effect of various lubricants such as mineral oil, fatty oil, and oil containing additives, in preventing wear of surfaces.

To those skilled in the art to which this invention relates, many changes in construction and widely differing embodiments and applications of the invention will suggest themselves without departing from the spirit and scope of the invention. For example, instead of just one filter counter A, a test apparatus might include two or more such filter counters with each counter being provided with a filter 40 of different known porosity. This arrangement would permit a comparative study of wear particle sizes based on a single wear determination. Also, it will be apparent that additional counters with or without filters may, if desired, be inserted in the system as a further means of insuring the efficiency or accuracy of the test for varying degrees of radioactivity, circulation rate, or filterability. Accordingly, it should be understood that the disclosures and the description herein are purely illustrative and are not intended to be in any sense limiting.

We claim:

1. A method of determining wear of relatively moving surfaces, continuously, which comprises providing a pair of surfaces at least one of which is radioactive, causing wear between said surfaces in the presence of a lubricant capable of carrying radioactive debris resulting from wear of the radioactive surface, measuring the radioactivity of the lubricant carrying said debris, filtering portions of said radioactive wear debris from said lubricant on a filter surface spaced a uniform distance from a device for measuring radioactivity, and measuring the radioactivity of said filtered portion.

2. Apparatus for repeated momentary measurement of the radioactivity of lubricating oil containing radioactive wear products, a portion of which are susceptible to settling, said apparatus comprising the combination of a plurality of counting cells each having means for conducting a stream of oil along a path lying at a constant distance from a radiation counter, said cells being identical except that all but one of said cells contains a concentric thin-walled filter cylinder at said constant distance adapted to filter from said oil said portion susceptible to settling; and means for passing the oil through said cells in series, whereby said one cell registers the radiation count of unsettled wear products while the other cells register the radiation count of the portions filtered out thereby.

3. A method for making repeated momentary measurements of the radioactivity of lubricating oil circulated in contact with a radioactive wear surface, so that radioactive wear products are carried by said oil, a portion of said radioactive wear products being susceptible to settling from said oil, said method comprising: passing a stream of oil past a first radiation counter and there measuring its radioactivity during passage; filtering from said stream the wear products susceptible to settling at a fixed distance from a second radiation counter while measuring there the combined radioactivity of said stream and the filtered wear products, and then returning said stream to further contact with said wear surface.

4. In a method for measuring wear of a radioactive wear surface in contact with a fluid lubricant, wherein a stream of the lubricant is continually circulated past a radiation counter, and the radioactivity thereof measured in transit by said counter, the novel step of measuring the radioactivity of particles susceptible to settling out from said lubricant by circulating said stream of lubricant past a second radiation counter while filtering said stream at a constant spaced distance therefrom lying close thereto, so that the filtered particles tend to actuate said second counter in a measure determined only by the intensity of radiations therefrom.

5. A method for measuring the wear on a metal surface wherein at least one surface is radioactive and wherein a lubricant is circulated through said surfaces and wear is indicated by the radioactivity of said stream, the method comprising comparative measurement in two stages of said lubricant, one stage being an unfiltered measuring stage, the second stage being a combined filtering and measuring stage, the filtering being done at a constant distance from the measuring, so that the measuring at that stage is proportionate only to the intensity of material at the filtering distance, and comparing the two stages.

References Cited in the file of this patent

UNITED STATES PATENTS

| | | |
|---|---|---|
| 2,315,845 | Ferris | Apr. 6, 1943 |
| 2,528,955 | Hayward | Nov. 7, 1950 |
| 2,661,845 | Sullivan | Dec. 8, 1953 |
| 2,751,506 | Black et al. | June 19, 1956 |

OTHER REFERENCES

"Radioactive Cutting Tools for Rapid Tool-Life Testing," by Merchant et al., from Transactions of the A.S.M.E., May 1953, pages 549 to 559.